US009690397B2

(12) United States Patent
Shepelev et al.

(10) Patent No.: US 9,690,397 B2
(45) Date of Patent: Jun. 27, 2017

(54) SYSTEM AND METHOD FOR DETECTING AN ACTIVE PEN WITH A MATRIX SENSOR

(71) Applicant: Synaptics Incorporated, San Jose, CA (US)

(72) Inventors: Petr Shepelev, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 80 days.

(21) Appl. No.: 14/584,926

(22) Filed: Dec. 29, 2014

(65) Prior Publication Data

US 2015/0338937 A1 Nov. 26, 2015

Related U.S. Application Data

(60) Provisional application No. 62/000,740, filed on May 20, 2014.

(51) Int. Cl.
*G06F 3/0354* (2013.01)
*G06F 3/044* (2006.01)
*G06F 3/041* (2006.01)

(52) U.S. Cl.
CPC .......... *G06F 3/03545* (2013.01); *G06F 3/041* (2013.01); *G06F 3/044* (2013.01); *G06F 2203/04106* (2013.01)

(58) Field of Classification Search
CPC . G06F 2203/04106; G06F 2203/04107; G06F 3/03545; G06F 3/041; G06F 3/044
See application file for complete search history.

(56) References Cited

U.S. PATENT DOCUMENTS

| 4,087,625 A | 5/1978 | Dym et al. |
| 4,233,522 A | 11/1980 | Grummer et al. |
| 4,237,421 A | 12/1980 | Waldron |
| 4,264,903 A | 4/1981 | Bigelow |
| 4,293,987 A | 10/1981 | Gottbreht et al. |

(Continued)

FOREIGN PATENT DOCUMENTS

| CN | 2436978 Y | 6/2001 |
| CN | 1490713 A | 4/2004 |

(Continued)

OTHER PUBLICATIONS

International Search Report; PCT/US2013/021314 dated Jun. 25, 2013.

(Continued)

*Primary Examiner* — Kenneth Bukowski
(74) *Attorney, Agent, or Firm* — Patterson + Sheridan, LLP

(57) ABSTRACT

A processing system, input device, and method are disclosed to detect an active input device. The method includes operating a first portion of a plurality of sensor electrodes to receive an active input signal from an active input device, and operating a second portion of the plurality of sensor electrodes to receive capacitive sensing data corresponding to a passive input device. The first and second portions include at least one sensor electrode in common. The method also includes driving a plurality of display electrodes to update a display image, wherein the plurality of sensor electrodes includes at least one of the plurality of display electrodes.

20 Claims, 7 Drawing Sheets

(56) References Cited

U.S. PATENT DOCUMENTS

| | | |
|---|---|---|
| 4,484,026 A | 11/1984 | Thornburg |
| 4,492,958 A | 1/1985 | Minami |
| 4,550,221 A | 10/1985 | Mabusth |
| 4,550,310 A | 10/1985 | Yamaguchi et al. |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 6,054,979 A | 4/2000 | Sellers |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0062140 A1 | 3/2008 | Hotelling et al. |
| 2008/0062147 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |
| 2008/0246723 A1 | 10/2008 | Baumbach |
| 2008/0259044 A1 | 10/2008 | Utsunomiya et al. |
| 2008/0264699 A1 | 10/2008 | Chang et al. |
| 2008/0265914 A1 | 10/2008 | Matsushima |
| 2008/0297176 A1 | 12/2008 | Douglas |
| 2008/0308323 A1 | 12/2008 | Huang et al. |
| 2008/0309635 A1 | 12/2008 | Matsuo |
| 2009/0002337 A1 | 1/2009 | Chang |
| 2009/0002338 A1 | 1/2009 | Kinoshita et al. |
| 2009/0040191 A1 | 2/2009 | Tong et al. |
| 2009/0046077 A1 | 2/2009 | Tanaka et al. |
| 2009/0091551 A1 | 4/2009 | Hotelling et al. |
| 2009/0096757 A1 | 4/2009 | Hotelling et al. |
| 2009/0107737 A1 | 4/2009 | Reynolds et al. |
| 2009/0128518 A1 | 5/2009 | Kinoshita et al. |
| 2009/0135151 A1 | 5/2009 | Sun |
| 2009/0153509 A1 | 6/2009 | Jiang et al. |
| 2009/0160682 A1 | 6/2009 | Bolender et al. |
| 2009/0185100 A1 | 7/2009 | Matsuhira et al. |
| 2009/0201267 A1 | 8/2009 | Akimoto et al. |
| 2009/0207154 A1 | 8/2009 | Chino |
| 2009/0213082 A1 | 8/2009 | Ku |

(56) References Cited

U.S. PATENT DOCUMENTS

| | | |
|---|---|---|
| 2009/0213534 A1 | 8/2009 | Sakai |
| 2009/0236151 A1 | 9/2009 | Yeh et al. |
| 2009/0262096 A1 | 10/2009 | Teramoto |
| 2009/0267916 A1 | 10/2009 | Hotelling |
| 2009/0273571 A1 | 11/2009 | Bowens |
| 2009/0273573 A1 | 11/2009 | Hotelling |
| 2009/0277695 A1 | 11/2009 | Liu et al. |
| 2009/0283340 A1 | 11/2009 | Liu et al. |
| 2009/0303203 A1 | 12/2009 | Yilmaz et al. |
| 2009/0309850 A1 | 12/2009 | Yang |
| 2009/0314621 A1 | 12/2009 | Hotelling |
| 2009/0324621 A1 | 12/2009 | Senter et al. |
| 2010/0001966 A1 | 1/2010 | Lii et al. |
| 2010/0001973 A1 | 1/2010 | Hotelling et al. |
| 2010/0006347 A1 | 1/2010 | Yang |
| 2010/0013745 A1 | 1/2010 | Kim et al. |
| 2010/0013800 A1 | 1/2010 | Elias et al. |
| 2010/0044122 A1 | 2/2010 | Sleeman et al. |
| 2010/0090979 A1 | 4/2010 | Bae |
| 2010/0134422 A1 | 6/2010 | Borras |
| 2010/0140359 A1 | 6/2010 | Hamm et al. |
| 2010/0144391 A1 | 6/2010 | Chang et al. |
| 2010/0147600 A1 | 6/2010 | Orsley |
| 2010/0149108 A1 | 6/2010 | Hotelling et al. |
| 2010/0156839 A1 | 6/2010 | Ellis |
| 2010/0163394 A1 | 7/2010 | Tang et al. |
| 2010/0182273 A1 | 7/2010 | Noguchi et al. |
| 2010/0188359 A1 | 7/2010 | Lee |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0214247 A1 | 8/2010 | Tang et al. |
| 2010/0220075 A1 | 9/2010 | Kuo et al. |
| 2010/0258360 A1 | 10/2010 | Yilmaz |
| 2010/0265210 A1 | 10/2010 | Nakanishi et al. |
| 2010/0271330 A1 | 10/2010 | Philipp |
| 2010/0277433 A1 | 11/2010 | Lee et al. |
| 2010/0289770 A1 | 11/2010 | Lee et al. |
| 2010/0291973 A1 | 11/2010 | Nakahara et al. |
| 2010/0302201 A1 | 12/2010 | Ritter et al. |
| 2010/0321043 A1 | 12/2010 | Philipp et al. |
| 2010/0321326 A1 | 12/2010 | Grunthaner et al. |
| 2011/0006999 A1 | 1/2011 | Chang et al. |
| 2011/0007030 A1 | 1/2011 | Mo et al. |
| 2011/0018841 A1 | 1/2011 | Hristov |
| 2011/0022351 A1 | 1/2011 | Philipp et al. |
| 2011/0025635 A1 | 2/2011 | Lee |
| 2011/0025639 A1 | 2/2011 | Trend et al. |
| 2011/0048812 A1 | 3/2011 | Yilmaz |
| 2011/0048813 A1 | 3/2011 | Yilmaz |
| 2011/0057887 A1 | 3/2011 | Lin et al. |
| 2011/0062969 A1 | 3/2011 | Hargreaves et al. |
| 2011/0062971 A1 | 3/2011 | Badaye |
| 2011/0063251 A1 | 3/2011 | Geaghan et al. |
| 2011/0080357 A1 | 4/2011 | Park et al. |
| 2011/0090159 A1 | 4/2011 | Kurashima |
| 2011/0096016 A1 | 4/2011 | Yilmaz |
| 2011/0109579 A1 | 5/2011 | Wang et al. |
| 2011/0109590 A1 | 5/2011 | Park |
| 2011/0141051 A1 | 6/2011 | Ryu |
| 2011/0148435 A1* | 6/2011 | Schwartz ............ G06F 3/0416 324/658 |
| 2011/0169770 A1 | 7/2011 | Mishina et al. |
| 2011/0175834 A1* | 7/2011 | Han ................... G06F 3/044 345/173 |
| 2011/0187666 A1 | 8/2011 | Min |
| 2011/0242444 A1 | 10/2011 | Song |
| 2011/0248949 A1 | 10/2011 | Chang et al. |
| 2011/0267300 A1 | 11/2011 | Serban et al. |
| 2011/0273391 A1 | 11/2011 | Bae |
| 2011/0298746 A1 | 12/2011 | Hotelling |
| 2012/0038585 A1 | 2/2012 | Kim |
| 2012/0044171 A1 | 2/2012 | Lee et al. |
| 2012/0056820 A1 | 3/2012 | Corbridge |
| 2012/0120011 A1* | 5/2012 | Teng .................. G06F 3/044 345/173 |
| 2012/0218199 A1 | 8/2012 | Kim et al. |
| 2012/0313901 A1 | 12/2012 | Monson |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2013/0321296 A1 | 12/2013 | Lee et al. |
| 2013/0342770 A1* | 12/2013 | Kim .................. G06F 3/044 349/12 |
| 2014/0347311 A1* | 11/2014 | Joharapurkar .......... G06F 3/044 345/174 |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-2010136932 A1 | 12/2010 |

OTHER PUBLICATIONS

Quantum Research Group. "Qmatrix Technology White Paper", 2006. 4 Pages.

Lubart, et al. "One Layer Optically Transparent Keyboard for Input Display", IP.com. Mar. 1, 1979. 3 Pages.

Gary L. Barrett et al. "Projected Capacitive Touch Technology", "Touch Technology Information Display", www.informationaldisplay.org <http://www.informationaldisplay.org>, Mar. 2010 vol. 26 No. 3, pp. 16-21.

Quantum Research Application Note An -KD01. "Qmatrix Panel Design Guidelines", Oct. 10, 2002. 4 Pages.

Calvin Wang et al. "Single Side All-Point-Addressable Clear Glass Substrate Sensor Design", IP.com. Apr. 2, 2009. 3 Pages.

Tsz-Kin Ho et al. "32.3: Simple Single-Layer Multi-Touch Projected Capacitive Touch Panel", SID 2009 Digest, pp. 447-450.

Johannes Schoning et al. "Multi-Touch Surfaces: A Technical Guide", Technical Report TUM-I0833. 2008.

Shawn Day. "Low Cost Touch Sensor on the Underside of a Casing", IP.com. Oct. 14, 2004.

Ken Gilleo. "The Circuit Centennial", Apr. 28, 2003, Total of 7 pages.

Ken Gilleo, "The Definitive History of the Printed Circuit", 1999 PC Fab.

Hal Philipp. "Charge Transfer Sensing", vol. 19, No. 2. 1999. pp. 96-105.

Paul Leopardi, "A Partition of the Unit Sphere into Regions of Equal Area and Small Diameter", 2005.

Olivier Bau, "TeslaTouch: Electrovibration for Touch Surfaces", 2010.

Colin Holland. "SID: Single Layer Technology Boosts Capacitive Touchscreens", www.eetimes.com/General. 2011.

"Novel Single Layer Touchscreen Based on Indium", 2011.

"Mesh Patterns for Capacitive Touch or Proximity Sensors", IP.com. May 14, 2010. 3pages.

"IDT Claims World's First True Single-Layer Multi-Touch Projected Capacitive Touch Screen Technology", EE Times Europe. Dec. 8, 2010.

Tracy V. Wilson et al. "How the iPhone Works", HowStuffWorks "Multi-touch Systems". 2011.

(56) References Cited

OTHER PUBLICATIONS

Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.
Mike Williams, "Dream Screens from Graphene", Technology Developed at Rice could Revolutionize Touch-Screen Displays. Aug. 2011.
ASIC Packaging Guidebook, Toshiba Corporation. (2000). 35 pages.
Fujitsu Microelectronics Limited. "IC Package." (2002). 10 pages.
International Search Report, PCT/US2013/021314 dated Jun. 25, 2013.

* cited by examiner

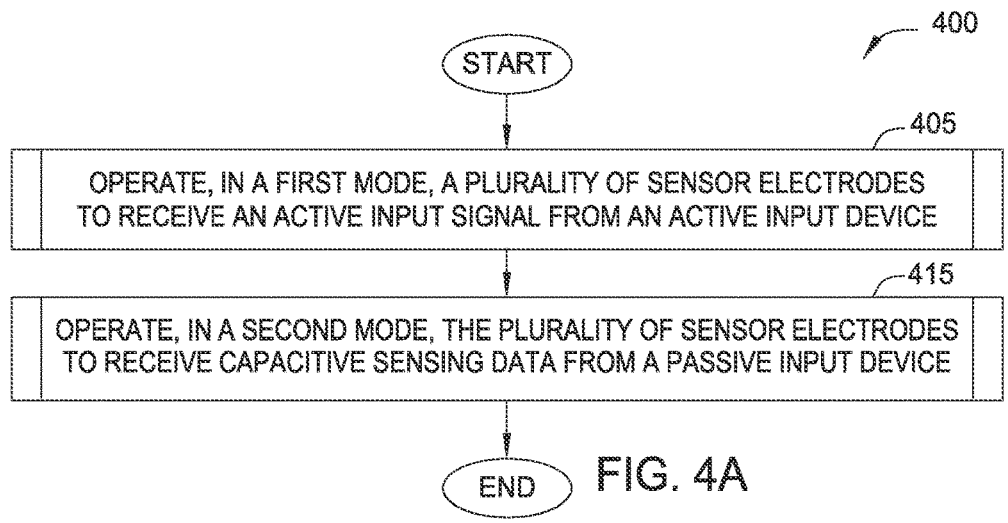
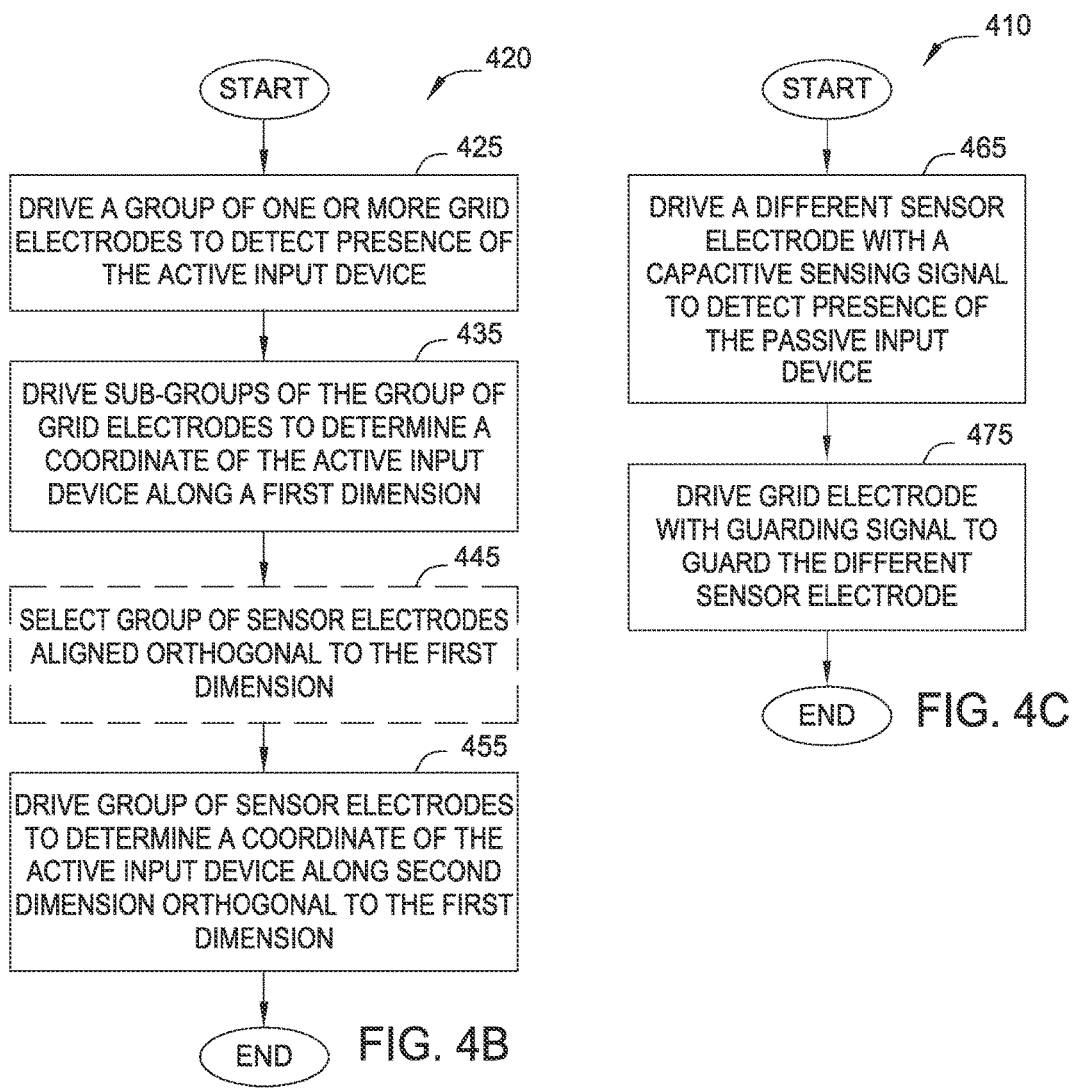

SYSTEM AND METHOD FOR DETECTING AN ACTIVE PEN WITH A MATRIX SENSOR

CROSS-REFERENCE TO RELATED APPLICATIONS

This application claims benefit of U.S. provisional patent application Ser. No. 62/000,740, filed May 20, 2014, entitled "System and Method for Detecting an Active Pen with a Matrix Sensor," which is herein incorporated by reference.

BACKGROUND

Field of the Disclosure

Embodiments of the present disclosure generally relate to electronic devices.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In one embodiment, a processing system is disclosed that includes a display module configured to drive a display signal onto a plurality of display electrodes for updating a display, and a sensor module configured to communicate with a plurality of sensor electrodes, wherein the plurality of sensor electrodes includes at least one of the plurality of display electrodes. The sensor module is configured to operate, in a first mode of operation, a first portion of the plurality of sensor electrodes to receive an active input signal from an active input device, and to operate, in a second mode of operation, a second portion of the plurality of sensor electrodes to receive capacitive sensing data corresponding to a passive input device. The first and second portions include at least one sensor electrode in common.

In another embodiment, an input device is disclosed that includes a plurality of sensor electrodes, at least one of the plurality of sensor electrodes being operable to update a display image and to perform input sensing, and a processing system coupled with the plurality of sensor electrodes. The processing system is configured to operate, in a first mode of operation, a first portion of the plurality of sensor electrodes to receive an active input signal from an active input device, and to operate, in a second mode of operation, a second portion of the plurality of sensor electrodes to receive capacitive sensing data corresponding to a passive input device. The first and second portions include at least one sensor electrode in common.

In yet another embodiment, a method is disclosed that includes operating a first portion of a plurality of sensor electrodes to receive an active input signal from an active input device, and operating a second portion of the plurality of sensor electrodes to receive capacitive sensing data corresponding to a passive input device. The first and second portions include at least one sensor electrode in common. The method also includes driving a plurality of display electrodes to update a display image, wherein the plurality of sensor electrodes includes at least one of the plurality of display electrodes.

BRIEF DESCRIPTION OF DRAWINGS

So that the manner in which the above recited features of the present invention can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4A illustrates a method of operating sensor electrodes for receiving inputs from active and passive input devices, according to one embodiment.

FIG. 4B illustrates a method of operating sensor electrodes for determining a position of an active input device, according to one embodiment.

FIG. 4C illustrates a method of operating sensor electrodes for determining a position of a passive input device, according to one embodiment.

Figure 1:
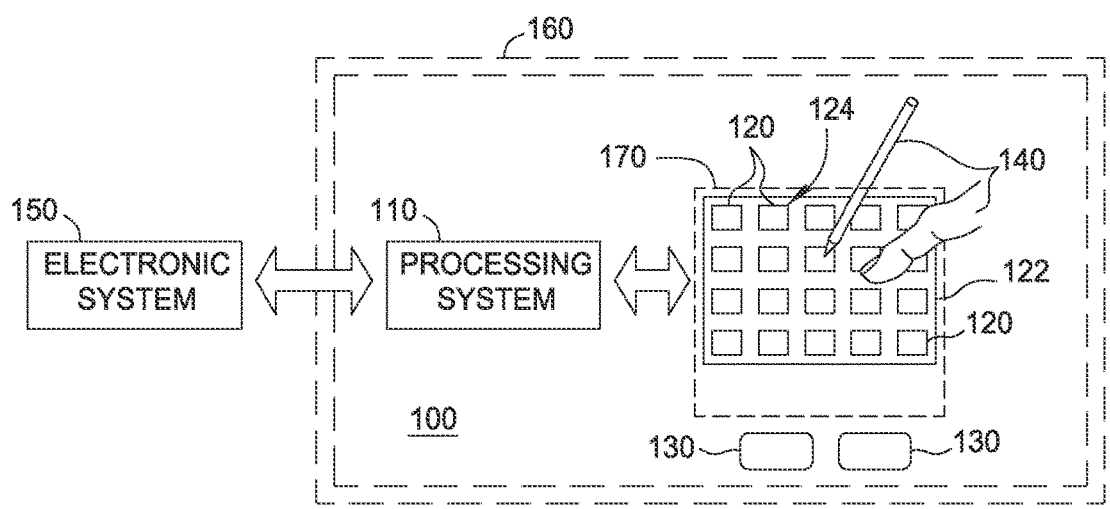
FIG. 1 is a schematic block diagram of an input device 100, according to some embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various embodiments of the present technology provide input devices and methods for improving usability.

Techniques are disclosed for coordinating active and passive input sensing. Specifically, various techniques may be used to resolve both communication channel and positional inputs from an active input device using a processing system that is also configured to receive input from passive input devices. In some cases, these arrangements may be used to perform both active and passive input sensing within particular sensing time windows (such as discrete sensing frames) substantially using the same sensing hardware implementations (e.g., shared sensor electrodes). In some cases, the sensing elements are included within a passive input-based input device, and the arrangements may be used to operationally adapt the input device to (also) receive input from active input devices.

FIG. 1 is a schematic block diagram of an input device 100 in accordance with embodiments of the present technology. In one embodiment, input device 100 comprises a display device comprising an integrated sensing device. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some nonlimiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IrDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120 and one or more grid electrodes 122. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g., system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device. 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation; and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example; the processing system 110 may perform filtering; demodulation or other signal conditioning. In various embodiments processing system 110 generates a capacitive image directly from the resulting signals received with sensing elements 124 (sensor electrodes 120). In other embodiments, processing system 110 spatially filters (e.g., raking a difference, weighted sum of neighboring elements) the resulting signals received with sensing elements 124 (or sensor electrodes 120) to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLEO), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate and/or Vcom voltages). Shared components may include display electrodes, substrates, connectors and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
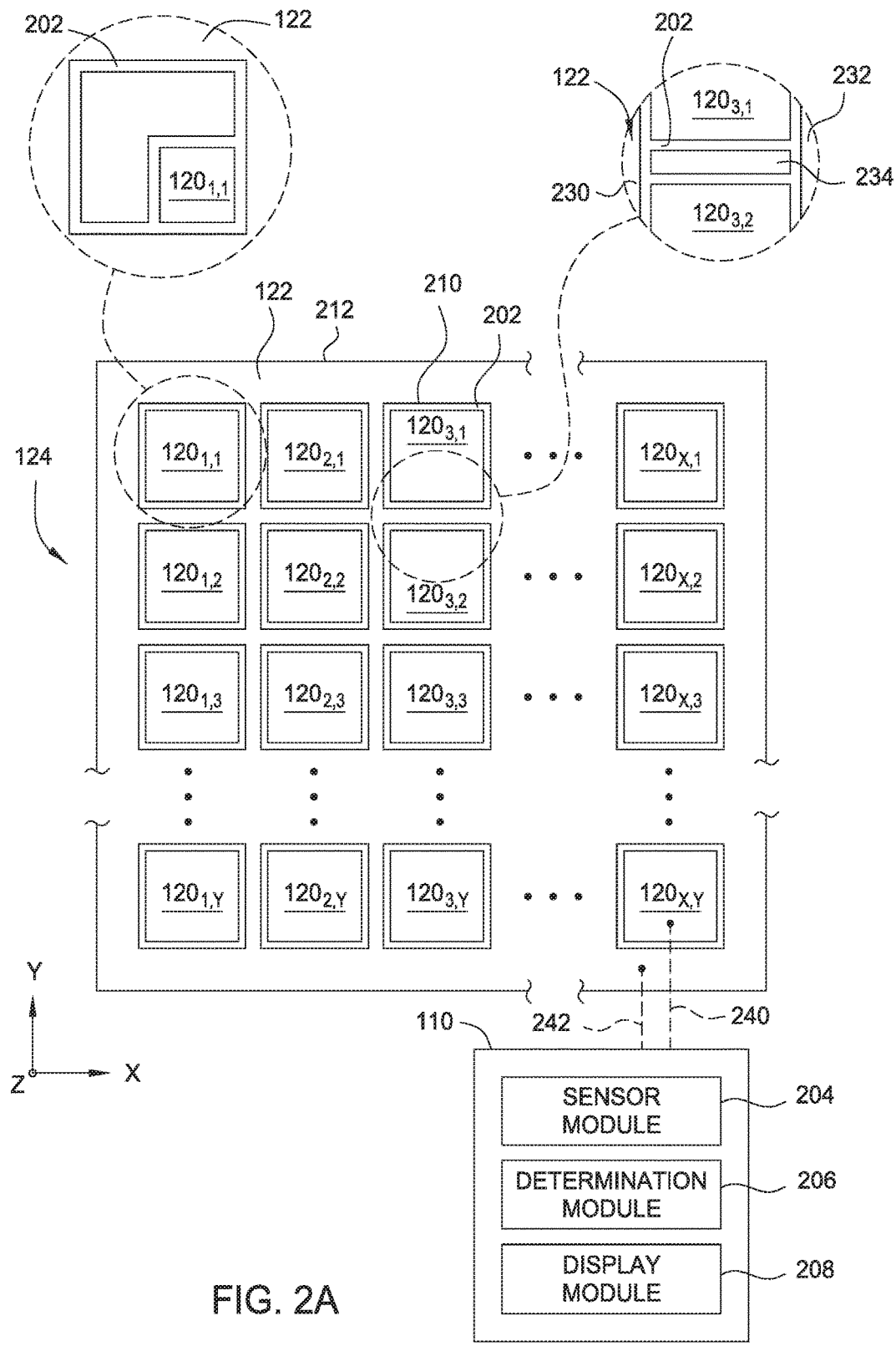
FIGS. 2A-2D illustrate portions of exemplary patterns of sensing elements 124 configured to sense in the sensing region 170 associated with the pattern, according to some embodiments.

FIG. 2A shows a portion of an exemplary pattern of sensing elements 124 configured to sense in the sensing region 170 associated with the pattern, according to some embodiments. For clarity of illustration and description, FIG. 2A shows the sensor electrodes 120 of the sensing elements 124 in a pattern of simple rectangles with the grid electrode 122 disposed therebetween, and does not show various other components. The exemplary pattern of sensing elements 124 comprises an array of sensor electrodes $120_{X,Y}$ (referred collectively as sensor electrodes 120) arranged in X columns and Y rows, wherein X and Y are positive integers, although one of X and Y may be zero. It is contemplated that the pattern of sensing elements 124 may comprises a plurality of sensor electrodes 120 having other configurations, such as polar arrays, repeating patters, non-repeating patterns, a single row or column, or other suitable arrangement. Further, in various embodiments the number of sensor electrodes may vary from row to row and/or column to column. In one embodiment, at least one row and/or column of sensor electrodes 120 is offset from the others, such it extends further in at least one direction than the others. The sensor electrodes 120 and grid electrodes 122 are coupled to the processing system 110 and utilized to determine the presence (or lack thereof) of an input object 140 in the sensing region 170.

In a first mode of operation, the arrangement of sensor electrodes 120 ($120_{1,1}$-$120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

The sensor electrodes 120 are typically ohmically isolated from each other, and also ohmically isolated from the grid electrode 122. That is; one or more insulators separate the sensor electrodes 120 (and grid electrode 122) and prevent them from electrically shorting to each other. In some embodiments, the sensor electrodes 120 and grid electrode 122 are separated by insulative gap 202. The insulative gap 202 separating the sensor electrodes 120 and grid electrode 122 may be filled with an electrically insulating material, or may be an air gap. In some embodiments, the sensor electrodes 120 and the grid electrode 122 are vertically separated by one or more layers of insulative material. In some other embodiments; the sensor electrodes 120 and the grid electrode 122 are separated by one or more substrates; for example, they may be disposed on opposite sides of the same substrate, or on different substrates. In yet other embodiments, the grid electrode 122 may be composed of multiple layers on the same substrate, or on different substrates. In one embodiment, a first grid electrode may be formed on a first substrate or first side of a substrate and a second grid electrode may be formed on a second substrate or a second side of a substrate. For example, a first grid comprises one or more common electrodes disposed on a TFT layer of the display device 160 and a second grid electrode is disposed on the color filter glass of the display device 160. In one embodiment, the dimensions of the first grid electrode are equal to the dimensions of the second grid electrode. In one embodiment, at least one dimension of the first grid electrode differs from a dimension of the second grid electrode. For example, the first grid electrode may be configured such that is disposed between a first and second sensor electrode 120 and the second grid electrode may be configured such that it overlaps at least one of the first and second sensor electrodes 120 and the first grid electrode. Further, the first grid electrode may be configured such that it is disposed between a first and second sensor electrode 120 and the second grid electrode may be configured such that it only overlaps the first grid electrode and is smaller than the first grid electrode.

In a second mode of operation, the sensor electrodes 120 ($120_{1,1}$-$120_{X,Y}$) may be utilized to detect the presence of an input object via transcapacitive sensing techniques when a transmitter signal is driven onto the grid electrode 122. That is, processing system 110 is configured drive the grid electrode 122 with a transmitter signal and receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to operate switch between any two or more of the modes described above.

The areas of localized capacitive sensing of capacitive couplings may be termed "capacitive pixels." Capacitive pixels may be formed between an individual sensor electrode 120 and reference voltage in the first mode of operation, between the sensor electrodes 120 and grid electrode 122 in the second mode of operation, and between groups of sensor electrodes 120 used as transmitter and receiver electrodes. The capacitive coupling changes with the proximity and motion of input objects 140 in the sensing region 170 associated with the sensing elements 124, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit a transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes are received with using a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode with a transmitter or other signal and/or voltage potential. In one embodiment, the switching element may be configured to couple more than one receiver electrode to a common receiver at the same time.

In other embodiments, "scanning" sensor electrodes 120 to determine these capacitive coupling comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment each of the sensor electrodes 120 are simultaneously driven and received with, obtaining an absolute capacitive measurement simultaneously from each of the sensor electrodes 120. In various embodiments, processing system 110 may configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a course capacitive image that may not be usable to discern precise positional information. However, a course capacitive image may be used to sense presence of an input object. In one embodiment, the course capacitive image may be used to move processing system 110 or the input device 100 out of a doze or low power mode. In one embodiment, the course capacitive image may be used to move a capacitive sensor integrated circuit out of a doze mode or low power mode. In another embodiment, the course capacitive image may be used to move a host integrated circuit out of a doze mode or low power mode. The course capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground or from stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the Active Matrix display such as one or more segments of a segmented Vcom electrode (common electrode(s)), a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g.; In-Plane Switching (IPS), Fringe Field Switching (FFS) or Plane-to-Line Switching (PLS) Organic Light Emitting Diode (OLED)), on the bottom of the color filter glass of some display screens (e.g., Patterned Vertical Alignment (PVA) or Mufti-domain Vertical Alignment (MVA)), over an emissive layer (OLED), etc. In such embodiments, the display electrode can also be referred to as a "combination electrode", since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode 122 comprise one or more common electrodes, various other display electrodes as describe above may also be used in conjunction with the common electrode or as an alternative to the common electrodes. In various embodiments, the sensor electrodes 120 and grid electrode 122 comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 2A, the processing system 110 coupled to the sensor electrodes 120 includes a sensor module 204 and optionally, a display driver module 208. The sensor module 204 includes circuitry configured to drive at least one of the sensor electrodes 120 for capacitive sensing during periods in which input sensing is desired. In one embodiment, the sensor module is configured to drive a modulated signal onto the at least one sensor electrode to detect changes in absolute capacitance between the at least one sensor electrode and an input object. In another embodiment, the sensor module is configured to drive a transmitter signal onto the at least one sensor electrode to detect changes in a transcapacitance between the at least one sensor electrode and another sensor electrode. The modulated and transmitter signals are generally varying voltage signals comprising a plurality of voltage transitions over a period of time allocated for input sensing. In various embodiments, the sensor electrodes 120 and/or grid electrode 122 may be driven differently in different modes of operation. In one embodiment, the sensor electrodes 120 and/or grid electrode 122 may be driven with signals (modulated signals, transmitter signals and/or shield signals) that may differ in any one of phase, amplitude and/or shape. In various embodiments, three modulated signal and transmitter signal are similar in at least one shape, frequency, amplitude and/or phase. In other embodiments, the modulated signal and the transmitter signals are different in frequency, shape, phase, amplitude and phase. The sensor module 204 may be selectively coupled one or more of the sensor electrodes 120 and/or the grid electrode 122. For example, the sensor module 204 may be coupled selected portions of the sensor electrodes 120 and operate in either an absolute or transcapacitive sensing mode. In another example, the sensor module 204 may be a different portion of the sensor electrodes 120 and operate in either an absolute or transcapacitive sensing mode. In yet another example, the sensor module 204 may be coupled to all the sensor electrodes 120 and operate in either an absolute or transcapacitive sensing mode. The sensor module 204 is also configured to operate the grid electrode 122 as a shield electrode. Processing system 110 is configured to operate the grid electrode 122 as a shield electrode that may shield sensor electrodes 120 from the electrical effects of nearby conductors. In one embodiment, processing system is configured to operate the grid electrode 12 as a shield electrode that may shield sensor electrodes 120 from the electrical effects of nearby conductors and guard the sensor electrodes 120 from grid electrode 122, at least partially reducing the parasitic capacitance between the grid electrode 122 and the sensor electrodes 120. In one embodiment, a shielding signal is driven onto the grid electrode 122. The shielding signal may be a ground signal, such as the system ground or other ground, or any other constant voltage (i.e., non-modulated) signal. In another embodiment, operating the grid electrode 122 as a shield electrode may comprise electrically floating the grid electrode. In embodiment, grid electrode 122 is able to operate as an effective shield electrode while being electrode floated due to its large coupling to the other sensor electrodes. In other embodiment, the shielding signal may be referred to as a guarding signal where the guarding signal is a varying voltage signal having at least one of a similar phase, frequency and amplitude as the modulated signal driven on to the sensor electrodes. In one or more embodiment, routing (e.g., traces 240 and/or 242) may be shielded from responding to an input object due to routing beneath the grid electrode 122 and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period, where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 204 and display module 208 to provide accurate control of overlapping display updating and capacitive sensing periods with repeatable coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 204 includes circuitry configured to receive resulting signals with the sensing elements 124 comprising effects corresponding to the modulated signals or the transmitter signals during periods in which input sensing is desired. The sensor module 204 may determine a position of the input object 140 in the sensing region 170 or may provide a signal including information indicative of the resulting signal to another module or processor, for example, determination module or a processor of the electronic device 150 (i.e., a host processor), for determining the position of the input object 140 in the sensing region 170.

The display driver module 208 may be included in or separate from the processing system 110. The display driver module 208 includes circuitry confirmed to provide display image update information to the display of the display device 160 during non-sensing (e.g., display updating) periods. In one embodiment, the sensor module 204 and display driver module 208 may be comprised within a common integrated circuit (first controller). In another embodiment, the sensor module 204 and display module 208 are comprised within separate integrated circuits. In those embodiments comprising multiple integrated circuits, a synchronization mechanism may be coupled between them, configured to synchronize display updating periods, sensing periods, transmitter signals, display update signals and the like. In one embodiment, portions of the sensor module 204 and/or the display driver module 208 may be included on separate integrated circuits. For example, a first portion of sensor module 204 may be included in a first integrated circuit with the display driver module 208, while a second portion of sensor module 204 is included in a second integrated circuit. In one embodiment, the portions of sensor module 204 and/or display driver module 208 included on particular integrated circuits may be based on functional groupings. For example, processing functions such as display processing and sensor input processing may be included within a first integrated circuit (such as a timing controller circuit), while driving functions such as display driving and sensor electrode driving are included on a second integrated circuit (such as a source driver circuit).

As discussed above, the sensor electrodes 120 of the sensing elements 124 may be formed as discrete geometric forms, polygons, bars, pads, lines or other shape, which are ohmically isolated from one another. In various embodiments, ohmically isolated comprises passively isolated, where active switches may be configured to couple different sensor electrodes to the same signal during a period of time. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials, or the combination of the two. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, molybdenum and conductive carbon materials, among others and various sensor electrodes may be formed of a deposited stack of different conductive materials. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed from a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, in various embodiments, the sensor electrodes 120 may comprise a center to center pitch in the range of about 4 to about 5 mm; however, in other embodiments, the pitch may be less than about 4 mm or greater than about 5 mm.

The grid electrode 122 may be fabricated similar to the sensor electrodes 120. The sensor electrodes 120 and the grid electrode 122 may be coupled to the processing system 110 utilizing conductive traces 240, 242 (shown in phantom). The conductive traces 240, 242 may be formed in the same plane at least one of the sensor electrodes 120 and the grid electrode 122, or may be formed on one or more separate substrates and connected to the respective electrodes 120, 122 by vias (not shown). Conductive traces 240 and 242 may be formed on a metal layer disposed such that the sensor electrodes 120 are between the metal layer and the input object. In one embodiment the metal layer comprises source driver lines and/or gate lines for a display device. The conductive traces 240, 242, and vias between them may be obscured from a user by a black mask layer disposed between them and the user of the display device. At least one of the conductive traces 240 and 242 may comprise one or more routing traces (conductors) in the source driver metal layer. In one or more embodiments such a layer may be referred to as metal interconnect layer two. Further, conductive traces 240 and/or 242 may be disposed on a metal layer between source driver lines. Alternately, at least one of the conductive traces 240 and 242 may comprise one or more conductors in the gate driver metal layer or gate driver lines not configured for display updating. Further, conductive traces 240 and/or 242 may be disposed on a metal layer between gate driver lines. In another embodiment, at least one of the conductive traces 240 and 242 may comprise one or more conductors in the Vcom jumper metal layer or Vcom lines not otherwise configured for display updating. Further, conductive traces 240 and/or 242 may be disposed on a metal layer between gate electrodes. In other embodiments the metal layer is included in addition to a layer comprising the source driver lines and/or gate lines. A portion of the conductive traces 140, 142 may also be formed laterally outward of the areal bounds of the sensing elements 124. In various embodiments, the conductive traces 240 and/or 242 may be disposed in a Vcom electrode jumper layer. The Vcom electrode jumper layer may be referred to as metal layer three or a metal interconnect layer three. In one embodiment, conductive traces may be disposed on both a source drive layer and a Vcom electrode jumper layer. In various embodiments, the display device may comprise a "dual gate" or "half source driver" configuration, allowing conductive routing traces 240 and/or 242 to be disposed between source drivers on the source driver layer. In one or more embodiments, orthogonal directions of connections between the conductive traces 240 and 242 they may be place on separate layers with vias between them The grid electrode 122 is disposed between at least two of the sensor electrodes 120. The grid electrode 122 may at least partially circumscribe the plurality of sensor electrodes 120 as a group, and may also, or in the alternative, completely or partially circumscribe one or more of the sensor electrodes 120. In one embodiment, the grid electrode 122 is a planar body 212 having a plurality of apertures 210, each aperture 210 circumscribing a respective one of the sensor electrodes 120. Accordingly, the grid electrode 122 separates and circumscribes at least 3 or more of sensor electrodes 120, and in this example, separates and circumscribes all of sensor electrodes 120. The gap 202 spaces the body 212 from the sensor electrode 120 disposed in the aperture 210. In one or more embodiments, the field electrode 122 is configured to substantially fill the space defined by the gap 202. In one embodiment a second grid electrode may be disposed on a substrate between grid electrode 122 and a touch input layer. The second grid electrode may be the same size as grid electrode 122, or larger than grid electrode 122 such that is overlaps one more sensor electrodes 120 and grid electrode or smaller than grid electrode 122 such that it overlaps a portion of the grid electrode 122. In various embodiments, the grid electrode 122 is disposed between at least two of sensor electrodes 120 such that the grid electrode 122 is on different layer (i.e., different substrate or side of the same substrate) and overlaps a portion of at least two sensor electrodes and the gap between the sensor electrodes. In the embodiments where the sensor electrodes 120 comprise one or more common electrodes, the sensor electrodes may comprise the entirety of the common electrode layer.

The grid electrode 122 may also be segmented. The segmentation of the grid electrode 122 may allow segments of the grid electrode 122 be less visible. The segments may be interconnect using traces or vias, so that the all the segments of the grid electrode 122 may be driven simultaneously with a common signal. Alternatively, one or more of the segments of the grid electrode 122 may be driven independently to facilitate scanning of the sensor electrodes 120 when configured as receiver electrodes in certain modes of operation as discussed further below.

As shown in the enlargement of FIG. 2A, the grid electrode 122 may include a first segment 230, a second segment 232 and a third segment 234. The first and second segments 230, 232 are offset from each other and sandwich a column of sensor electrodes, shown as sensor electrodes $120_{2,1}$, $120_{2,2}$. Although not shown in the enlargement, the first segment 230 also separates the column of sensor electrodes $120_{2,Y}$ from sensor electrode $102_{1,Y}$ while the second segment 232 separates the column of sensor electrodes $120_{2,Y}$ from sensor electrode $102_{3,Y}$. The third segment 234 is disposed between neighboring sensors electrodes 120 within a column, shown as sensor electrodes $120_{2,1}$, $102_{2,2}$. Two or more of the segments 230, 232, 234 may be independently driven, for example as transmitter electrodes.

Figure 2B:
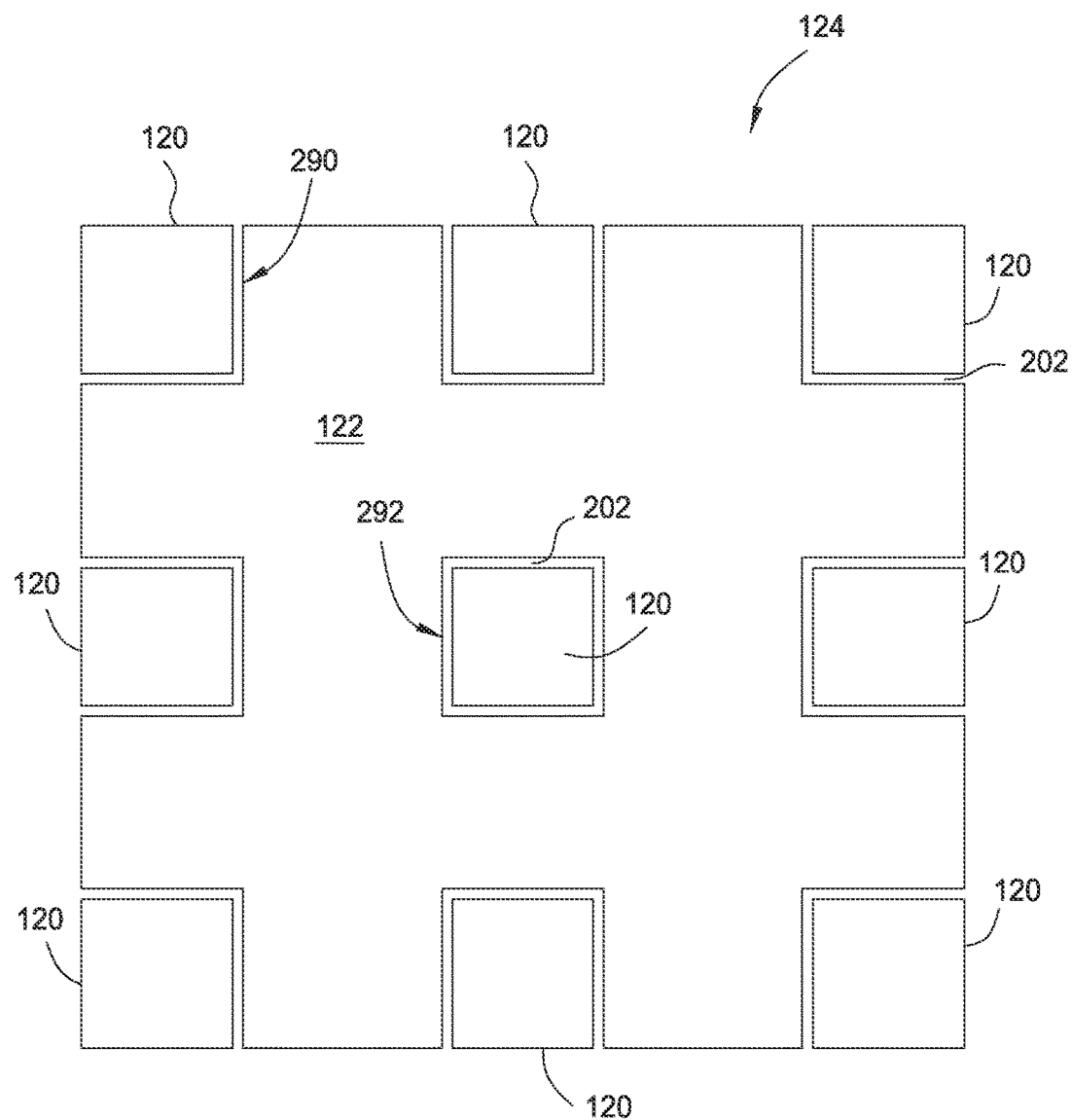

FIG. 2B illustrates an alternative array of sensor elements 124 that may be used in the input device 100 of FIG. 1. As illustrated in FIG. 2B, sensor elements 124 includes a grid electrode 122 that may comprise substantially more surface area than the sensor electrodes 120. In the embodiment of FIG. 2B the grid electrode 122 at least partially circumscribes one or more sensor electrodes 120, for example as indicated by reference arrow 290. Additionally, or in the alternative, the grid electrode 122 completely circumscribes at least one sensor electrode 120 and only partially circumscribes other sensor electrodes 120, for example as indicated by reference arrows 290 and 292. In other embodiments, the grid electrode 122 may completely circumscribe all of the sensor electrodes 120. Although not shown in FIG. 2B, it is contemplated that the grid electrode 122 may be segmented as described with reference to FIG. 2A.

Figure 2C:
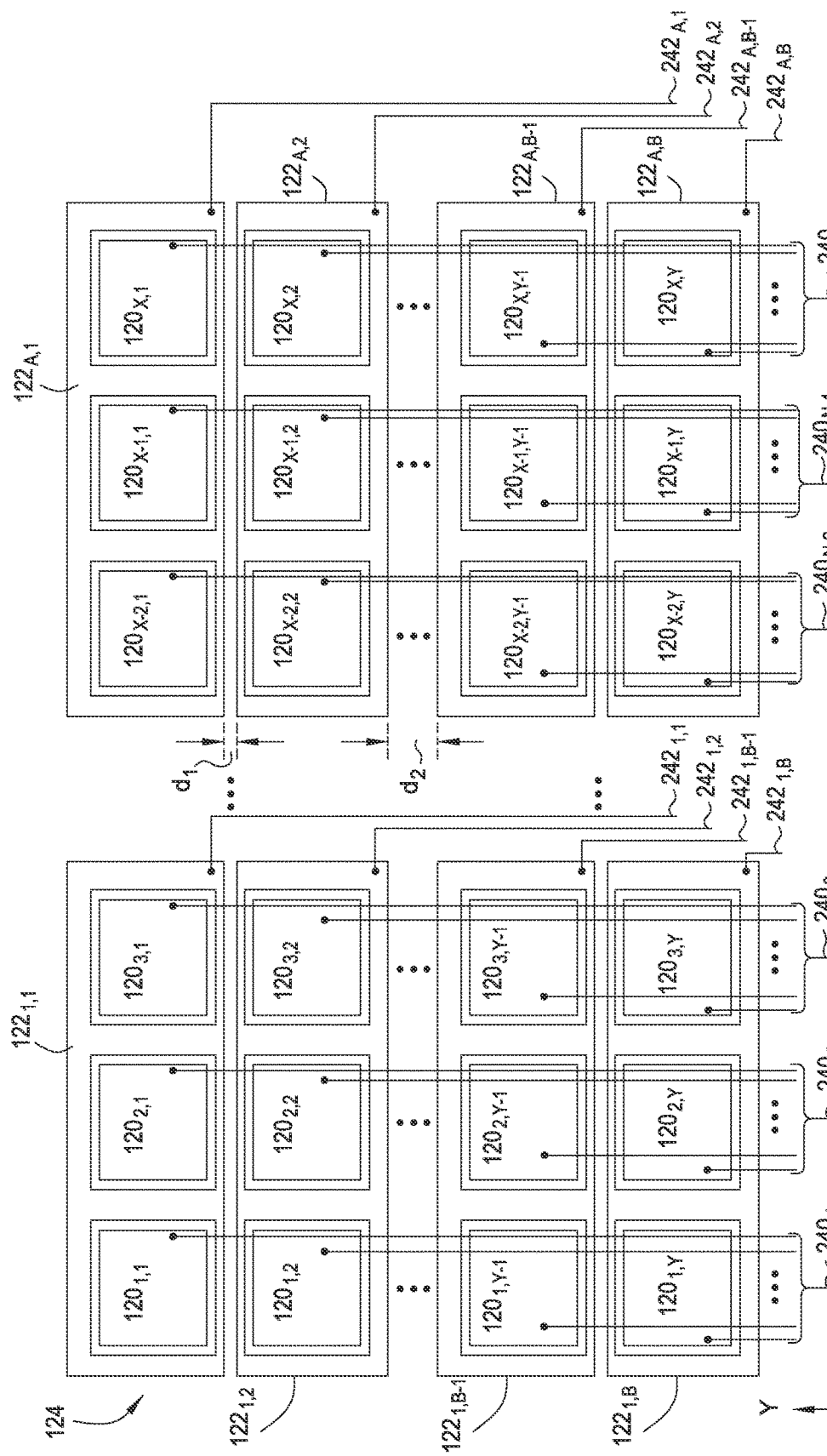

FIG. 2C illustrates an alternative array of sensor elements 124 that may be used in the input device 100 of FIG. 1. As illustrated in FIG. 2C, sensor elements 124 include more than one grid electrode, collectively referred to as grid electrode 122 and illustratively shown as grid electrodes $122_{(A,B)}$, where A and B are non-zero integers. In the embodiment of FIG. 2C, each grid electrode 122 at least partially circumscribes a different set of sensor electrodes 120, wherein a set of sensor electrodes is defined as a group of sensor electrodes that are at least partially circumscribed by a common one of the grid electrodes 122. Each grid electrode 122 may be substantially similar in and size and circumscribe the same number of sensor electrodes 120; however; in other embodiments, the grid electrodes 122 may differ in at least one of size and the number sensor electrodes 120 at least partially circumscribed. Further, while the embodiment of FIG. 2C illustrates eight grid electrodes 122, in other embodiments, the input device 100 may comprise two or more grid electrodes 122. In one embodiment, each grid electrode 122 may be independently coupled to processing system 110 via different conductive routing traces, shown as traces $242_{(1,1)}$, $242_{(1,B)}$, $242_{(A,1)}$, and $242_{(A,B)}$. In other embodiments, two or more grid electrodes 122 may be coupled to processing system 110 via a common conductive routing trace 242, in other words, the traces $242_{(1,1)}$, $242_{(1,B)}$, $242_{(A,1)}$, and $242_{(A,B)}$ are ganged together. In such an embodiment; a multiplexer (or similar circuitry) may be used to switch between grid electrodes 122.

The plurality of grid electrodes 122 may be arranged in an orientation having an areal extent extending farther in a first direction than in a second direction orthogonal to the first direction. In one embodiment, each grid electrode 122 is arranged in an orientation having an area extent extending farther in the first direction than in the second direction. In another embodiment, each grid electrode 122 is arranged in an orientation having an area extent extending farther in the second direction than the first direction. In yet other embodiments, each grid electrode 122 is arranged in an orientation having an areal extent extending a substantially equal distance in the first and second directions. Further, the grid electrodes 122 may be configured such that one or more grid electrode. 122 has an area extent which is oriented differently than at least one other grid electrode 122. For example, a first grid electrode 122 may extend further in the first direction than the second direction and a second grid electrode 122 may extend further in the second direction than the first. In other examples, other combinations of grid electrode 122 orientations are possible. In other embodiments, the grid electrodes 122 may be oriented such that each grid electrode 122 is substantially similar in size. At least one of the sensor electrodes 120 or sets of sensor electrodes 120 may be similarly configured as described above with reference to the grid electrodes 122.

Figure 2D:
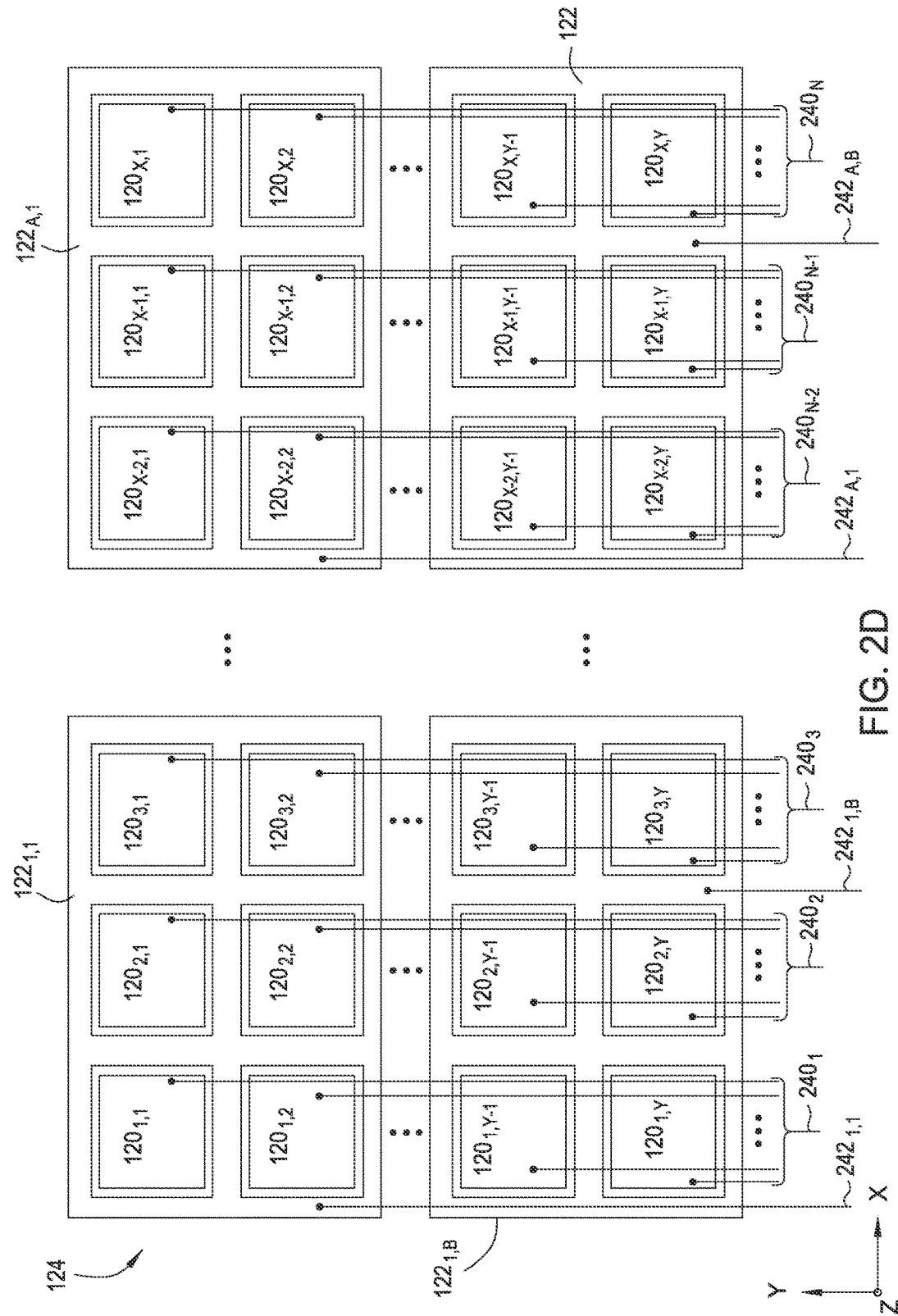

In some embodiments, a set of sensor electrodes 120 circumscribed by a single grid electrode 122 may be aligned in a single row. In other embodiments, a set of sensor electrodes 120 circumscribed by a single grid electrode 122 may be linearly aligned in a single row, such as shown in the embodiment depicted in FIG. 2C. In yet other embodiments, a set of sensor electrodes 120 circumscribed by a single grid electrode 122 may be aligned in a plurality of rows, such as shown in the embodiment depicted in FIG. 2D. The number and/or orientation of the sensor electrodes 120 circumscribed by one grid electrode 122 may be the same as, or different than, the number and/or orientation of the sensor electrodes 120 circumscribed by a different grid electrode 122.

In some embodiments, the grid electrodes 122 may be spatially separated by desired amounts along one or more axes or directions in order to provide desired electrical characteristics of the grid electrodes for operation in the input device. In one embodiment, each of the grid electrodes 122 is separated by a same distance in one or more axes. For example, each grid electrode 122 may be separated from adjacent grid electrode(s) by a first distance $d_1$ along the y-direction, and separated by a second distance (not shown) along the x-direction. In other embodiments, the first and second distances may be selectively varied. For example, the grid electrodes $122_{A,1}$ and $122_{A,2}$ are separated in the y-direction by first distance $d_1$, and (assume for this example that there are no grid electrodes between $122_{A,2}$ and $122_{A,B-1}$) the grid electrodes $122_{A,2}$ and $122_{A,B-1}$ are separated in the y-direction by a different distance $d_2$. Similar variations in distances may be provided between grid electrodes in other directions, such as the x-direction.

The different distances between grid electrodes may be disposed with any feasible pattern, whether repeating or non-repeating, symmetrical or asymmetrical, etc. For example, an alternating pattern may be used, where distances between adjacent grid electrodes are alternated (e.g., d1, d2, d1, d2, . . . ). Another example is a progressive pattern, where distances between adjacent grid electrodes increases or decreases incrementally (e.g.; d1, d2>d1, d3>d2, . . . ). Another example is a pyramid pattern that includes incremental increases (or decreases) from an original distance to a maximum (or minimum) distance, and then incrementally decreases (or increases) from the maximum (or minimum) to the original distance (or any alternative end distance value). Of course, variations of these patterns are possible. While patterns of distances have been described here relative to one particular direction (e.g., x-direction or y-direction), it is contemplated that more complex patterns may be used relative to a plurality of directions (e.g., both x and y-directions).

The distances between grid electrodes 122, as well as the patterns of distances, may be preferentially selected to provide desired electrical characteristics of the grid electrodes within the input device. In one example, the distances may be selected to control values of ground capacitance between each of the grid electrodes 122 and a system ground. Better control of ground capacitance values may provide improvements to the performance of an analog front end (AFE) that is coupled with the grid electrodes and used to sample signals from the various sensor electrodes.

In the embodiments, one or more sensor electrodes 120 may share a coupling with the processing system 110. The sensor electrodes 120 may be grouped such that at least two sensor electrodes are coupled in a direction that is orthogonal to the orientation of the grid electrode 122. For example, multiple sensor electrodes $120_{(3,1)}$, $120_{(3,2)}$, $120_{(3,\ Y-1)}$, and $120_{(3,Y)}$ have an orientation that is orthogonal to grid electrode $122_{(1,1)}$ and may be coupled to a common conductive routing trace $240_3$. In another example, each sensor electrode 120 may be coupled to a different conductive routing trace 240 and to a common pin of processing system 110. A multiplexer (or similar circuit element) may be coupled with the conductive routing trace(s) 240 so that the sensor electrodes 120 may be individually coupled with the processing system 110 when sharing a conductive routing trace 240. In another example, each sensor electrode 120 may be coupled to a different conductive routing trace 240, where each conductive routing trace 240 is coupled to a different pin of processing system 110. Processing system 110 may be configured to simultaneously receive with multiple sensor electrodes 120 or receive with each sensor electrode 120 independently. In one embodiment, processing system 110 may be configured to receive with a plurality of sensor electrodes 120 using a scanning, time-multiplexed scheme when more than one grid electrode 122 is driven with a transmitter signal. The grid electrodes may be adjacent to each other or non-adjacent to each other. In one embodiment, two sensor electrodes 120 may be simultaneously received with, while a grid electrode 122 that corresponds to at least one of the sensor electrodes 120 is driven with a transmitter signal.

Processing system 110 may be configured to simultaneously drive transmitter signals onto each grid electrode 122 and receive resulting signals with the sensor electrodes 120. In such an embodiment, each grid electrode 122 may be driven with a transmitter signal that is based on a different one of a plurality of digital codes. The digital codes may include any suitable code that provides mathematically independent results. In one embodiment, the digital codes for the set of transmitters are substantially orthogonal—i.e., exhibiting very low cross-correlation, as is known in the art. Note that two codes may be considered substantially orthogonal even when those codes do not exhibit strict, zero cross-correlation. In a particular embodiment, for example, the digital codes are pseudo-random sequence codes. In other embodiments, Walsh codes, Gold codes, or another appropriate quasi-orthogonal or orthogonal codes are used. In another embodiment, processing system 110 is configured to simultaneously drive the grid electrodes 122 with the same transmitter signal while independently receiving with the sensor electrodes 120. Some substantially orthogonal codes may be selected that have near-zero sums which reduce the effect of the codes coupling with display elements, one set of such codes being circulant codes in which each code vector is a rotation of the other vectors.

Processing system 110 may be configured to scan through the grid electrodes 122, driving transmitter signals on to the grid electrodes 122 one at a time, while receiving with the sensor electrodes 120. In one embodiment, only those sensor electrodes 120 that are circumscribed by the grid electrode 122 which is being driven are received with. In other embodiments, all of or some portion of the sensor electrodes 120 may be received with a grid electrode 122 that is being driven.

In some embodiments, the processing system 110 may be configured to selectively configure the grid electrode 122 or sensor electrodes 120 based on the positional information of an input object 140. For example, in one embodiment, processing system 110 may drive transmitter signals onto the grid electrodes 122 such that the grid electrode is driven as one large grid electrode 122. Processing system 110 may selectively drive only a portion of the grid electrodes 122 that are proximate the detected input object or objects 140. For example, in one embodiment, processing system 110 may drive shielding signals onto the grid electrodes 122 such that the grid electrode is driven as one large grid electrode 122. Further, processing system 110 may selectively drive only a portion of the grid electrodes 122 proximate to the detected input object or objects 140 with the shielding signal. In one embodiment, the driving scheme (as discussed above) used to drive the grid electrode 122 may vary based on the positional information of the input object or objects 140.

In various embodiments, processing system 110 is configured to receive resulting signals with the grid electrode 122 and to determine positional information for an active input device based on the resulting signal. As defined herein, an active input device provides input by emitting one or more electrical signals that are capable of being detected within a sensing region of an input device (e.g., sensing region 170 of input device 100). Some non-limiting examples of active input devices include powered pens or styli, but other suitable form factors and arrangements may be used. An active input device generally includes a power source (such as a battery) and powered circuitry. Additional aspects of active input devices are discussed below with respect to FIG. 3.

Likewise, while the general operation of sensor electrodes 120 and grid electrodes) 122 for active input sensing is discussed below, further implementation details are discussed with respect to FIG. 3. In such embodiments, the resulting signals comprise effects corresponding to an active input signal transmitted by the active input device. In those embodiments comprising a single grid electrode 122, to detect an active input device, processing system 110 is configure to receive resulting signals with the grid electrode 122; the resulting signals comprising effects corresponding to the active input signal. In such embodiments, processing system 110 is able to detect a presence of the active input device or lack thereof, i.e., zero-dimensional positional information. In those embodiments employing multiple grid electrodes 122, processing system 110 may be able to determine the presence of an active input device, as well as the device's position along one or more axes.

In those embodiments comprising a single grid electrode 122, once an active input device is detected in the sensing region, processing system 110 may operate sensor electrodes 120 to determine position of the active input device. Processing system 110 may operate the sensor electrodes 120 in various patterns using one or more switching elements or multiplexers to determine the position of the active input device. In one embodiment, the sensor electrodes 120 may be configured such that they are formed into first groups during a first time period to determine position along a first axis and then formed into second groups during a second time period to determine position along a second axis. In various embodiments, the first groups may form one of rows and columns and the second groups may form the other rows and the columns. In one or more embodiments, the sensors electrodes 120 may be grouped to form one or more larger sensor electrodes having various shapes and sizes.

In one embodiment, processing system 110 may operate grid electrode 122 to determine presence of an active input device and simultaneously operate sensor electrodes 120 to determine positional information for active input device. In others embodiments, processing system 110 may operate grid electrode 122 to determine presence of an active input device and sequentially scan through the sensor electrodes 120 to determine positional information for active input device, operating one or more of the sensor electrodes 120 at a time.

In embodiments comprising a plurality of grid electrodes 122, processing system 110 may be configured to operate at least two grid electrodes 122 simultaneously to determine presence of an active input device, and to operate groups of the grid electrodes to determine positional information of an active input device along one or more axes. In one or more embodiments, the sensor electrodes 120 that are used to determine positional information of the active input device may be included within different grid electrodes 122, and the grid electrodes 122 may also be operated to determine positional information of the active input device.

Sensor electrodes 120 may be coupled to processing system 110 to detect an active input device along a first axis and a second axis. In one embodiment, the sensor electrodes may be coupled to processing system through a plurality of multiplexers or other switching mechanism to form groups of sensor electrodes that may be operated simultaneously to determine positional information of an active input device along a first and second axis. The first groups of sensor electrodes 120 may be operated simultaneously to determine position of an active input device along a first axis and the second groups of sensor electrodes 120 may be operated simultaneously to determine along a second axis. In one embodiment, the first groups of sensor electrodes may correspond to rows and the second groups of sensor electrodes may correspond to columns. Processing system 110 may be configured to operate the first groups of sensor electrodes 120 to determine a first profile and to operate the second groups of sensor electrodes 120 to determine a second profile. In various embodiments, the sensor electrodes 120 may be formed into groups having various shapes and sizes and may be formed along one or more axis. In such embodiments, processing system 110 may operate the sensor electrodes 120 to detect and determine position for the active input device. The sensor electrodes 120 may be coupled to the processing system 110 in a first way to detect an active input device during a first time period and coupled to the processing system 110 in a second way to determine position of the active input device during a second time period. Coupling the sensor electrodes 120 in the first way may comprise coupling the sensor electrodes 120 to the processing system 110 such that the groups of sensor electrodes that are formed have a larger pitch than the groups of sensor electrodes that are formed when the sensor electrodes are coupled in the second way.

Figure 3:
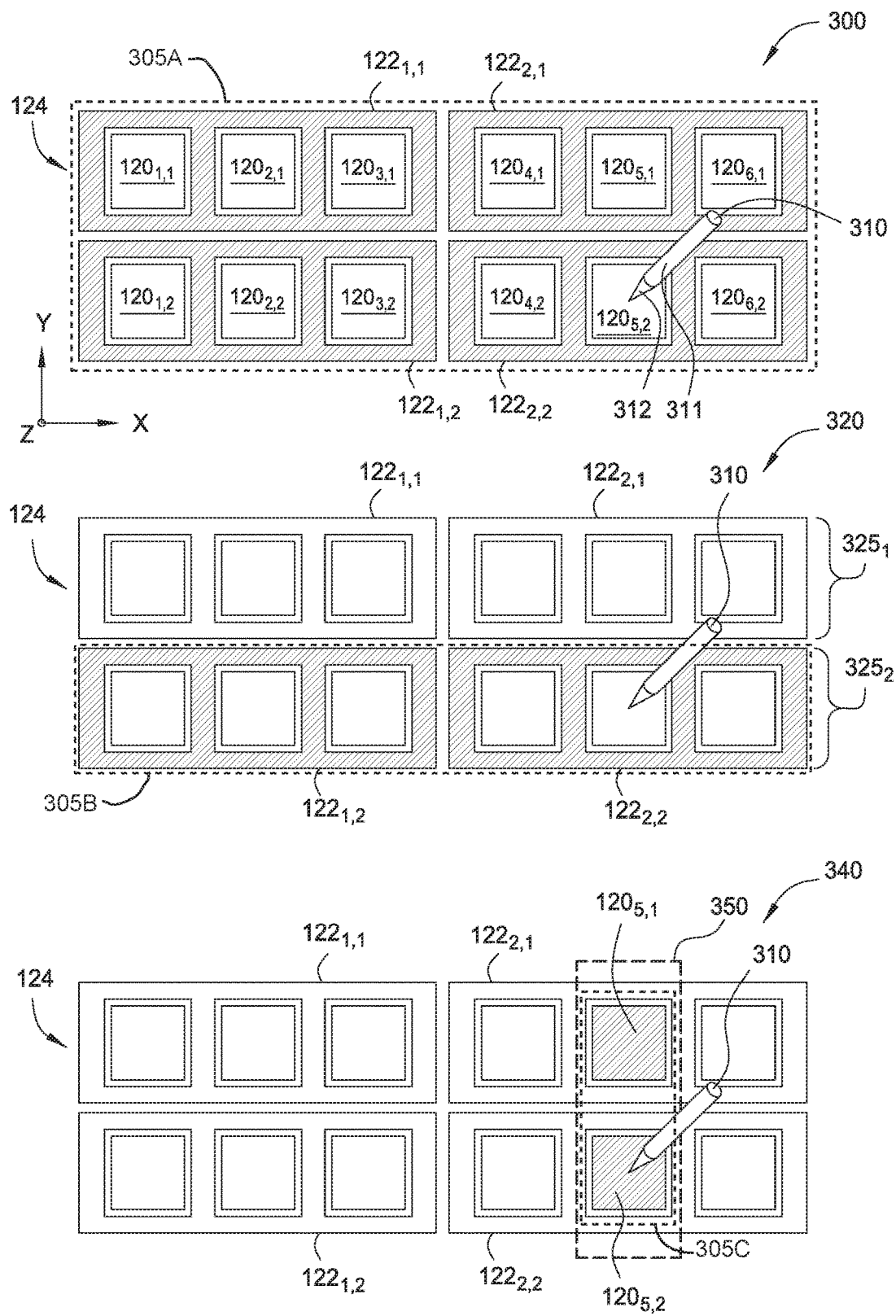
FIG. 3 illustrates operation of sensor electrodes to receive input from an active input device, according to one embodiment.

FIG. 3 illustrates operation of sensor electrodes to receive input from an active input device, according to one embodiment. Generally, the arrangements 300, 320, 340 (collectively, arrangements) each depict aspects of exemplary operation of sensing elements 124, which may be similar in arrangement to various embodiments depicted in FIGS. 2A-2D. The sensing elements 124 may be operated using a processing system 110 of an input device 100.

The arrangements depict four grid electrodes 122, each of which circumscribes one or more sensor electrodes 120, for example three sensor electrodes. For simplicity, the arrangements illustrate the grid electrodes 122 and sensor electrodes 120 without various components, such as electrical traces and related circuitry for processing signals from the electrodes. An active input device 310 is disposed at a position nearest to sensor electrode $120_{5,2}$. As shown, active input device 310 is depicted as an active pen, which includes circuitry within a housing 311 and which transmits input signals through a conductive pen tip 312. Signals that are generated by the active input device 310 may provide information to the processing system 110, which may include positional data, the operational state of various components of the active input device (e.g., a force applied on pen tip 312, whether buttons formed in housing 311 are depressed), battery data, device identification data, and so forth.

Arrangement 300 illustrates operation of the sensing elements 124 at a first time, where the processing system operates various sensor electrodes to determine a presence of the active input device 310. This zero-dimensional positional information may, in turn, be used when operating the sensing elements 124 to coordinate receiving inputs from both passive and active input devices.

Within arrangement 300, a first pattern of grid electrodes 122 is driven by the processing system 110 at the first time to obtain zero-dimensional positional information for the active input device 310. The driven electrodes are generally indicated by hatching. In one embodiment, all of the grid electrodes 122 included within the sensing region of the input device may be operated to receive active input signals emitted from the active input device 310. The concurrent operation of all of the grid electrodes 122 to detect the active input device may provide a greatest amount of spatial coverage of the sensing region, thereby improving detection performance. Additionally, in one embodiment, no multiplexing of the grid electrodes 122 is required to perform the sensing using the pattern of grid electrodes, generally allowing for quicker completion of the sensing.

In some embodiments, the processing system may drive the sensor electrodes (sensor electrodes 120 and/or grid electrodes 122) with desired signals to receive (or concurrent with receiving) the active input signal. In one embodiment, the signals driven on the sensor electrodes include a constant voltage. In another embodiment, the signals driven on the sensor electrodes include a modulated signal. In some cases, the processing system may be required to perform additional signal processing to distinguish and measure the active input signal while other signals are driven on the sensor electrodes.

In other embodiments, a different pattern of grid electrodes 122 may be driven at the first time for sensing from the active input device 310. In one embodiment, a contiguous group of grid electrodes nearest to one or more previous positions of the active input device may be driven. The size and composition of the group may depend on an elapsed time from the previous sensing of the active input device 310. For example, a larger group of grid electrodes may be driven in response to a longer elapsed time, as it is possible that the active input device has moved further during the elapsed time period. Similarly, the previous positions of the active input device 310 may be used to determine a velocity, direction of movement, and/or an estimated position of the active input device, which information may be used to select particular grid electrodes 122 for sensing the presence of the active input device (e.g., around the estimated position and/or along an expected path of the active input device corresponding to one or more of the velocity, direction, and time).

The zero-dimensional sensing performed within arrangement 300 may be performed with a regularity (or periodicity) in order to establish a communication channel for the active input device 310 to reliably communicate with the processing system 110. Of course, the periodicity of sensing may be determined by the properties of the signals transmitted from the active input device. For example, the active input device may provide bursts of information during periodic communication windows, and thus the period of sensing may be set based on the length of the windows, the length of the period between subsequent windows, etc. For this reason, several embodiments perform the driving of the pattern of grid electrodes 122 substantially concurrently, and not using a time-based sequence.

In some cases, the timing of active input signals emitted by the active input device 310 (e.g., when communication windows occur) may be initially unknown to the processing system 110. Accordingly, in some embodiments, the processing system may include a synchronization module that is configured to receive the active input signal using one or more sensor electrodes (such as grid electrodes 122), and to generate an estimate of at least one of the phase and frequency of the active input signal. In one embodiment, the synchronization module performs both phase and frequency estimation. In one embodiment, portions of the synchronization module are included in one or both of the sensor module 204 and determination module 206. In one embodiment, the sensor module 204 may also generate a guarding signal based on the estimated phase and/or frequency of the active input signal. The sensor module 204 may drive the guarding signal onto one or more electrodes that are communicatively coupled with the one or more sensor electrodes used to receive the active input signal (e.g., adjacent or nearby sensor electrodes).

In some embodiments, determining a presence of the active input device 310 may be based on determining a frequency or periodicity of signals received at the sensor electrodes 120 and/or grid electrodes 122. In some cases, the frequency and phase of active input signals are not known to the processing system 110, measurements of received signals may be used to estimate frequency and phase. In some embodiments, determining the presence of the active input device 310 may also include a comparing a computed signal-to-noise ratio (SNR) to a minimum threshold value, or by determining some other measure of signal strength over background noise.

Additionally, by performing sensing using a pattern of the grid electrodes 122, the processing system 110 may also concurrently perform other sensing. For example, the processing system may perform sensing for passive input devices (also referred to as passive input sensing) using the sensor electrodes 120 that at least partly overlaps in time with the active input device sensing. Generally, passive input devices generally do not emit electrical signals as input, but instead provide input by influencing nearby electrical signals. For example, a passive input device may be detected by performing capacitive coupling measurements using the various capacitive sensing techniques described above. In some embodiments, one or more sensor electrodes 120 are driven with a capacitive sensing signal, and the resulting detected signal indicates the presence or absence of a passive input device. Some non-limiting examples of passive input devices include fingers and unpowered pens or styli. Because the capacitive sensing signal is known, any effects experienced by nearby grid electrodes 122 due to driving the capacitive sensing signal may be mitigated by the processing system (e.g., subtracting an expected effect from grid electrode measurements).

Next, arrangement 320 illustrates operation of the sensing elements 124 at a second time, where the processing system operates various sensor electrodes to determine a position of the active input device 310 along a first dimension (or axis or direction). The second time generally occurs after sensing has been performed to detect the active input device 310

(e.g.; the sensing in arrangement 300). Generally, determining a position of the active input device 310 may include performing measurements of signals sensed at various sensor electrodes 120 and/or grid electrodes 122. In some cases, the determination may include computing a SNR (or other signal strength measure) for one or more of the sensor electrodes 120 and/or grid electrodes 122, and comparing the SNR against a threshold value and/or other computed SNRs for other sensor or grid electrodes. For example, the sensor electrode(s) 120 that correspond to the largest computed SNR(s) (i.e., having relatively the best signal strength) may be the closest of the plurality of sensor electrodes to the active input device. Other mathematical techniques such as interpolation may be used to determine positions with greater precision, and/or relative to a plurality of sensor electrode measurements. Although the positions of the active input device are discussed with respect to Cartesian coordinates (i.e., x, y, and z-directions), the techniques may also be applied to sensor arrangements that use alternate coordinate systems or are aligned along alternate dimensions (e.g., radial, spherical, irregular pattern).

The processing system 110 may drive group(s) of grid electrodes 122 that are arranged along the first dimension. In one embodiment, the processing system drives the different groups concurrently. In another embodiment, the processing system may drive the groups in a time sequence. As shown, to determine an active input device position in the y-direction, the grid electrodes $122_{1,1}$ and $122_{2,1}$ are grouped into a row $325_1$, and the grid electrodes $122_{1,2}$ and $122_{2,2}$ are grouped into a row $325_2$. Similarly, the "left-side" grid electrodes $122_{1,1}$ and $122_{1,2}$ and "right-side" grid electrodes $122_{2,1}$ and $122_{2,2}$ could be grouped into respective columns to determine active input device position in the x-direction. In one embodiment, the groups of grid electrodes are determined by the areal extent of the grid electrodes. For example, grid electrodes 122 extend further in the x-direction than in the y-direction. In this case, grouping grid electrodes into rows (i.e., grouping along the x-direction) may be beneficial, as it allows for greater resolution of position along the y-direction. For example, the resolution available by grouping the grid sensors into rows is roughly three times (3x) better than grouping the grid sensors into columns, merely based on the number and sizes of the sensor electrodes 120 that are enclosed by the grid electrode 122.

Next, arrangement 340 illustrates operation of the sensing elements 124 at a third time, where the processing system operates various sensor electrodes to determine a position of the active input device 310 along a second dimension (or axis or direction). The third time generally occurs after the first time (i.e., sensing performed to detect the active input device 310). The third time may occur before, after, or possibly overlapping with the second time (i.e., sensing performed to detect position along the first dimension).

As shown, the position of the active input device 310 along the x-direction is determined at this third time. In some embodiments, various sensor electrodes may be grouped together to perform the determination. For example, the sensor electrodes $120_{5,1}$ and $120_{5,2}$ are aligned along the y-direction and may be suitable for resolving a position in the x-direction, even though each sensor electrode is circumscribed by a different grid electrode 122. However, as discussed above, inputs from each sensor electrode 120 may be preferentially grouped to provide desired measurements. These groupings may form geometric shapes or patterns. For example, the groups of grid electrodes 122 may form horizontally-oriented "bars" while grouping inputs from sensor electrodes $120_{5,1}$ and $120_{5,2}$ effectively forms a vertically-oriented "stripe" 350. Of course, other combinations of sensor electrodes may form stripes arranged in parallel to stripe 350.

In some embodiments, the different classes of shapes have a substantially orthogonal orientation relative to the other. In other embodiments, the shapes may be arranged having alternate orientations. In some embodiments, grouping inputs from sensor electrodes 120 may generally provide better resolution in a particular dimension than grouped grid electrodes 122. This may be the case where the grid electrodes have a greater area extent in one dimension (e.g., having a long axis) relative to another dimension.

In one embodiment, the processing system 110 drives the different "stripes" of sensor electrodes 120 concurrently. In another embodiment, the processing system may drive the stripes in a time sequence. In one embodiment, the processing system may apply multiplexer circuitry so that an analog front end (AFE) component obtains measurements from selected sensor electrodes 120 within a particular stripe 350. In another embodiment, the processing system may use the AFE to concurrently sample some or all of the sensor electrodes within a stripe, then perform some digital combination of the inputs to resolve the position of the active input device.

In one embodiment, during the first, active input sensing mode of operation, the selected plurality of sensor electrodes (e.g., group of grid electrodes) defines a first spatial sensor pitch (or an effective coverage area 305A). During the second, passive input sensing mode of operation, the selected plurality of sensor electrodes (e.g., one or more matrix sensor electrodes) defines a second sensor pitch (or effective coverage areas 305B, 305C) that is smaller than the first sensor pitch or coverage area 305A. In some cases, the first sensor pitch may be larger to effectively accommodate receiving both communication channel and positional data from the active input device. In one embodiment, the sensing region does not include a grid electrode. The processing system in this case may for the first, active input sensing mode combine more than one row of (matrix) sensor electrodes using multiplexing techniques to provide a desired sensor pitch. The processing system may for the second, passive input sensing mode include fewer sensor electrodes, such as a single row.

The arrangements discussed above disclose various ways to resolve both communication channel and positional inputs from an active input device using a processing system that is also configured to receive input from passive input devices. Specifically, these arrangements may be used to perform both active and passive input sensing within particular sensing time windows (such as discrete sensing frames) substantially using the same sensing hardware implementations (e.g., shared sensor electrodes). In some cases, the sensing elements are included within a passive input-based input device, and the arrangements may be used to operationally adapt the input device to (also) receive input from active input devices.

FIG. 4A illustrates a method of operating sensor electrodes for receiving inputs from active and passive input devices, according to one embodiment. Method 400 may generally be used consistent with the descriptions of the patterns of sensing elements 124 and arrangements discussed above.

Method 400 begins at block 405, where a processing system, in a first mode of operation, operates a plurality of sensor electrodes to receive an active input signal from an active input device. In one embodiment, at least one of the plurality of sensor electrodes comprises at least one of a plurality of display electrodes that are configured to be driven with a display signal for updating a display.

In some embodiments, the plurality of sensor electrodes may be arranged in a matrix configuration, with one or more grid electrodes disposed in interstitial areas. In some cases, the grid electrodes partially or completely circumscribe the sensor electrodes.

At block 415, in a second mode of operation, the processing system operates the plurality of sensor electrodes to receive capacitive sensing data from a passive input device. According to various embodiments described herein, the active input sensing of block 405 and the passive input sensing of block 415 may be performed at different times or performed concurrently. Both active and passive input sensing may be performed within particular sensing time windows (such as discrete sensing frames) substantially using the same sensing hardware implementations (e.g., shared sensor electrodes). In some embodiments, the active and passive input sensing may be performed in the same or in different sub-regions of the sensing region.

FIG. 4B illustrates a method of operating sensor electrodes for determining a position of an active input device, according to one embodiment. Generally, the method 420 may be performed as part of block 405 of method 400, described above.

Method 420 begins at block 425, where the processing system drives a group of one or more grid electrodes to detect a presence of the active input device. In one embodiment, the one or more grid electrodes includes all of the grid electrodes within the particular sensing region. In one embodiment, the one or more grid electrodes are all driven at substantially the same time. The grid electrodes may be driven in this block to determine zero-dimensional position information (e.g., presence or absence) for the active input device. Block 425 may be performed with a periodicity to establish and maintain a communication channel with the active input device, whose transmitted signals may occur in discrete, periodic communication windows.

At block 435, the processing system drives one or more sub-groups of the grid electrodes in order to determine a positional coordinate of the active input device along a first dimension. In one embodiment, the grid electrodes may be grouped into rows or columns. In one embodiment, the grid electrodes include a long axis along a first dimension relative to a second dimension, and the grid electrodes may be grouped along the first dimension in order to provide better sensing resolution of the active input device.

At block 445, the processing system selects at least one group of one or more sensor electrodes that are aligned orthogonally to the first dimension. In one embodiment, the selected sensor electrodes do not include grid electrodes, but may include sensor electrodes circumscribed by one or more grid electrodes. In one embodiment, the grouped grid electrodes form "bars" and the grouped sensor electrodes form "stripes" orthogonal to the bars.

At block 455, the processing system drives one or more of the groups of sensor electrodes in order to determine a positional coordinate of the active input device along a second, orthogonal dimension. While this embodiment explicitly includes sensor electrodes arranged along orthogonal dimensions (e.g., according to the Cartesian coordinate system), it is contemplated that similar techniques may be applied to other, non-orthogonal arrangements, such as radial, spherical, or irregular sensor arrangements, in order to support active and passive input sensing.

FIG. 4C illustrates a method of operating sensor electrodes for determining a position of a passive input device, according to one embodiment. Generally, the method 460 may be performed as part of block 415 of method 400, described above.

Method 460 begins at block 465, where the processing system drives a different sensor electrode with a capacitive sensing signal to detect a presence of the passive input device. In one embodiment, this may be performed by driving one or more matrix sensor electrodes (e.g., not a grid electrode).

At block 475, the processing system drives the grid electrode with a guarding signal to guard the different sensor electrode that is driven with the capacitive sensing signal. In one embodiment, the driven grid electrode at least partially circumscribes the different sensor electrode. In some embodiments, blocks 465 and 475 are substantially overlapping in time.

Thus, the embodiments and examples set forth herein were presented in order to best explain the embodiments in accordance with the present technology and its particular application and to thereby enable those skilled in the art to make and use the present technology. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system, comprising:
   display circuitry configured to drive display signals onto a plurality of display electrodes for updating a display; and
   sensor circuitry configured to communicate with a plurality of sensor electrodes, the plurality of sensor electrodes comprising first and second sensor electrodes and a first grid electrode disposed between the first and second sensor electrodes, wherein the plurality of sensor electrodes includes at least one of the plurality of display electrodes, wherein the sensor circuitry is configured to:
      in a first mode of operation, operate a first portion of the plurality of sensor electrodes to receive an active input signal from an active input device, the first portion comprising the first grid electrode, and
      in a second mode of operation, operate a second portion of the plurality of sensor electrodes to receive input from a passive input device, the first and second portions including at least the first grid electrode in common, wherein operating the second portion comprises:
         receiving, using at least one of the first and second sensor electrodes and while driving the first grid electrode with a guarding signal, resulting signals corresponding to a driven capacitive sensing signal, wherein the guarding signal comprises a varying voltage signal having at least one of a similar phase, frequency, and amplitude as the driven capacitive sensing signal.

2. The processing system of claim 1,
   wherein operating the first portion of the plurality of sensor electrodes comprises determining a presence or absence of the active input device, and
   wherein operating the second portion of the plurality of sensor electrodes comprises determining a position of the passive input device.

3. The processing system of claim 1, wherein the first portion of the plurality of sensor electrodes further comprises the first and second sensor electrodes and a second grid electrode, and
wherein operating the first portion of the plurality of sensor electrodes comprises:
operating the first and second grid electrodes as a plurality of sensing rows to determine a position of the active input device in a first direction; and
operating the first and second sensor electrodes as a plurality of sensing columns to determine a position of the active input device in a second direction.

4. The processing system of claim 1, wherein sensor electrodes of the first portion of the plurality of sensor electrodes have a first coverage area, wherein the sensor circuitry is further configured to:
select sensor electrodes of the second portion of the plurality of sensor electrodes to have a second coverage area different from the first coverage area.

5. The processing system of claim 4, wherein the first coverage area is larger than the second coverage area.

6. The processing system of claim 1, wherein operating the second portion further comprises:
driving the capacitive sensing signal on the at least one of the first and second sensor electrodes.

7. The processing system of claim 1, wherein the display circuitry is further configured to update the display using each sensor electrode of the plurality of sensor electrodes.

8. An input device, comprising:
a plurality of sensor electrodes comprising first and second sensor electrodes and a first grid electrode disposed between the first and second sensor electrodes, wherein at least one of the plurality of sensor electrodes is operable to update a display image and to perform input sensing; and
a processing system coupled with the plurality of sensor electrodes, wherein the processing system is configured to:
in a first mode of operation, operate a first portion of the plurality of sensor electrodes to receive an active input signal from an active input device, the first portion comprising the first grid electrode, and
in a second mode of operation, operate a second portion of the plurality of sensor electrodes to receive input from a passive input device, the first and second portions including at least the first grid electrode in common, wherein operating the second portion comprises:
receiving, using at least one of the first and second sensor electrodes and while driving the first grid electrode with a guarding signal, resulting signals corresponding to a driven capacitive sensing signal, wherein the guarding signal comprises a varying voltage signal having at least one of a similar phase, frequency, and amplitude as the driven capacitive sensing signal.

9. The input device of claim 8, wherein the plurality of sensor electrodes includes a plurality of matrix electrodes disposed in a rectangular matrix arrangement.

10. The input device of claim 8,
wherein operating the first portion of the plurality of sensor electrodes comprises determining a presence or absence of the active input device, and
wherein operating the second portion of the plurality of sensor electrodes to comprises determining a position of the passive input device.

11. The input device of claim 8, wherein the first portion of the plurality of sensor electrodes further comprises the first and second sensor electrodes and a second grid electrode, and
wherein operating the first portion of the plurality of sensor electrodes comprises:
operating the first and second grid electrodes as a plurality of sensing rows to determine a position of the active input device in a first direction; and
operating the first and second sensor electrodes as a plurality of sensing columns to determine a position of the active input device in a second direction.

12. The input device of claim 8, wherein sensor electrodes of the first portion have a first coverage area, wherein the processing system is further configured to:
select sensor electrodes of the second portion of the plurality of sensor electrodes to have a second coverage area that is smaller than the first coverage area.

13. The input device of claim 8, wherein operating the second portion further comprises:
driving the capacitive sensing signal on at least one of the first and second sensor electrodes.

14. The input device of claim 8, wherein the at least one of the plurality of sensor electrodes operable to update a display image and to perform input sensing comprises at least one common electrode.

15. A method, comprising:
operating, in a first mode of operation, a first portion of a plurality of sensor electrodes to receive an active input signal from an active input device, the plurality of sensor electrodes comprising first and second sensor electrodes and a first grid electrode disposed between the first and second sensor electrodes, the first portion comprising the first grid electrode;
operating, in a second mode of operation, operating a second portion of the plurality of sensor electrodes to receive input from a passive input device, the first and second portions including at least the first grid electrode in common, wherein operating the second portion comprises:
receiving, using at least one of the first and second sensor electrodes and while driving the first grid electrode with a guarding signal, resulting signals corresponding to a driven capacitive sensing signal, wherein the guarding signal comprises a varying voltage signal having at least one of a similar phase, frequency, and amplitude as the driven capacitive sensing signal; and
driving, in a third mode of operation, a plurality of display electrodes to update a display image, wherein the plurality of sensor electrodes includes at least one of the plurality of display electrodes.

16. The method of claim 15, wherein at least some of the plurality of sensor electrodes are disposed in a rectangular matrix arrangement.

17. The method of claim 15,
wherein operating the first portion of the plurality of sensor electrodes comprises determining a presence of the active input device, and
wherein operating the second portion of the plurality of sensor electrodes comprising determining a position of the passive input device, and driving the first grid electrode to guard the at least one of the first and second sensor electrodes.

18. The method of claim 15, wherein the first portion of the plurality of sensor electrodes further comprises the first and second sensor electrodes and a second grid electrode, and wherein operating the first portion of the plurality of sensor electrodes comprises:
operating the first and second grid electrodes as a plurality of sensing rows to determine a position of the active input device in a first direction; and
operating the first and second sensor electrodes as a plurality of sensing columns to determine a position of the active input device in a second direction.

19. The method of claim 15, wherein sensor electrodes of the first portion of the plurality of sensor electrodes have a first coverage area, and wherein operating the second portion of the plurality of sensor electrodes comprises selecting sensor electrodes of the second portion to have a second coverage area smaller than the first coverage area.

20. The method of claim 15, wherein operating the second portion of the plurality of sensor electrodes further comprises:
driving the capacitive sensing signal on the at least one of the first and second sensor electrodes.

\* \* \* \* \*